United States Patent [19]

Clift et al.

[11] Patent Number: 4,949,735
[45] Date of Patent: Aug. 21, 1990

[54] TREATMENT OF PARTICULATE MATERIALS

[75] Inventors: Roland Clift, Godalming; Robert Legros, Guildford; Clive A. Millington, Godalming, all of England

[73] Assignee: British-American Tobacco Company Limited, London, England

[21] Appl. No.: 820,527

[22] Filed: Jan. 17, 1986

[30] Foreign Application Priority Data

Jan. 25, 1985 [GB] United Kingdom ............... 8501959

[51] Int. Cl.$^5$ .......................... A24B 3/18; A24B 3/12
[52] U.S. Cl. ................................. 131/291; 131/296; 131/108; 131/300; 34/10
[58] Field of Search ............. 131/108, 291, 296, 300; 40/109.1, 109.2, 109.3, 110, 84.3; 34/10

[56] References Cited

U.S. PATENT DOCUMENTS 3,386,182  6/1968  Lippert .................................. 34/10
3,417,978  12/1968  Suzukawa ............................. 34/10
4,076,509  2/1978  Ferm ..................................... 34/10

Primary Examiner—V. Millin
Attorney, Agent, or Firm—Kane, Dalsimer, Sullivan, Kurucz, Levy, Eisele and Richard

[57] ABSTRACT

In a method and apparatus for treating particulate material, the material, when in a mobilization zone bounded by upwardly divergent walls, is subjected to a flow of gaseous mobilizing medium, supplied at a multiplicity of sites of the walls, and preferably also to a simultaneous flow of gaseous accelerating medium supplied in an upward direction from a lower region of the zone. The treatments include drying, moistening, heating, cooling and blending.

16 Claims, 2 Drawing Sheets

TREATMENT OF PARTICULATE MATERIALS

This invention relates to a method and apparatus for the treatment of particulate materials. The invention is particularly relevant to the treatment of fibrous particulate materials such as, for example, cut lamina tobacco.

Proposals have been made for treating particulate tobacco and other particulate leaf materials according to methods which are said to involve fluidisation of the material. Thus in United Kingdom Patent Specification No. 1 389 452 there is disclosed a tobacco treatment apparatus in the operation of which tobacco is conveyed by a vibrating conveyor which is provided with a generally planar, air-permeable base through which hot air passes in an upward direction into contact with the tobacco. The tobacco is agitated by the vibratory movement of the conveyor and by the upwardly moving air. It is said in the specification that the tobacco is at least partially fluidised by these two effects in combination.

A method of, and apparatus for, drying tea is disclosed in United Kingdom Patent Specification No. 1 486 555. According to the disclosure of this specification, the tea is passed across a plurality of planar, perforate surfaces in succession. Warm air is passed upwardly through each of these surfaces and means is provided for vibrating each of the surfaces. According to the specification, the surfaces are caused to vibrate in order to prevent clogging of the perforations in the surfaces and also to prevent holes developing in the agitated bed of tea. It is also taught in Specification No. 1 486 555 that vibration of the perforate surfaces may provide a means of causing the tea to travel across the surfaces.

United Kingdom Patent Specification No. 2 026 668A discloses apparatus for drying or cooling particulate leaf material (tea or tobacco). In use of the apparatus, heated air is employed as a fluidising medium with the state object of maintaining the leaf material in a fluidised state. With a view to avoiding the production of holes in the bed of particulate leaf material, the apparatus comprises a fabric mesh which serves to distribute the fluidising air in an even manner to the bed. The fabric mesh is retained in a planar configuration by a frame. In order to assist in obtaining a uniform treatment of the leaf material the apparatus may be caused to vibrate.

According to the teaching of United States Patent Specification No. 4 148 325, a method of treating cut tobacco comprises treating the tobacco with a fluid medium in a chamber in which a columnar bed of the tobacco is maintained in a fluidised state by air which flows through the bed of tobacco after passing upwardly through a planar diffuser pad.

Looked at from a more general standpoint, fluidisation techniques have been used for many purposes in a large number of industries. Thus, for example United Kingdom Patent Specification No. 2 085 748A discloses fluidised bed apparatus for the combustion or gasification of coal and other such "lumpy" materials.

One of the attractions of fluidisation to the process engineer is the possibility of approaching a perfect mixing condition of solid phase particles in a fluidised bed. The perfect mixing phenomenon may be defined in a number of ways. Looked at in temperature terms, for instance, it implies that the maximum temperature of the particles differs but little from the mean temperature thereof. Thus in a fluidised bed in which a near perfect mixing condition obtains, a high temperature can be maintained without the occurrence of over-hot regions within the bed.

An approach to a perfect mixing condition may be readily made if the particles in the bed are of substantially uniform and roughly isometric shape and of not too disparate size and density. In the case of some particulate material, cut lamina tobacco for example, the particles depart significantly from these criteria. In the case of cut lamina tobacco the departure is marked in the specially important criterion of shape. Cut lamina tobacco comprises elongate particles of varying lengths and cross-sectional dimensions, together with shorter particles which vary widely as to shape and to particle mass. In a body of cut lamina tobacco the smaller particles are distributed within a tangled, air permeable matrix of the elongate particles. This constitution of cut lamina tobacco has been found to lead to problems when an attempt has been made to fluidise the material. In prior used fluidised bed apparatus it has been observed that the elongate particles of the cut lamina tobacco form a mat, in which mat the elongate particles remain in a tangled state. The lighter and the heavier of the shorter particles tend to segregate from the aforesaid mat, the lighter particles being located above and the heavier particles being located below the mat. Moreover, in such segregated bed there is an unacceptably high incidence of the formation of "blow holes". Thus it may be said of prior proposals for fluidising cut lamina tobacco, that a perfect mixing condition is not approached and neither is a stable fluidisation condition realised.

It is an object of the present invention to provide means by which fibrous particulate material may be effectively mobilised.

As used in herein the term "fibrous particulate material" means particulate material a substantial proportion at least of which comprises individual particles of which one length dimension is large by comparison with the other two length dimensions. Because of the presence of such elongate particles, within a body of fibrous particulate material there is a propensity for entanglement.

As used herein the term "mobilisation" means a controlled process in which in a body of particulate material individual particles are maintained in a substantially separated condition so that the particles are free to move relatively to each other. With reference to fibrous particulate material, mobilisation further means that the material is wholly or substantially disentangled and maintained in a disentangled, particle separated condition.

The present invention provides a method of treating particulate material, wherein particulate material is maintained in a mobilised state in a mobilisation zone bounded by wall means upwardly divergent from the vertical, whereby the horizontal cross-sectional area of said zone increases in an upward direction thereof, gaseous mobilising medium being supplied at a multiplicity of sites of said wall means to said zone whereby there obtains in said zone a circulatory pattern comprising downward flow at said wall means and upward flow from a lower region of said zone. The particulate material may be a fibrous particulate material.

Advantageously, gaseous accelerating medium is supplied to the mobilisation zone in an upward direction from a location at a lower region of the zone.

The present invention also provides mobilising apparatus comprising wall means bounding a mobilisation zone, said wall means being upwardly divergent from the vertical whereby the horizontal cross-sectional area of said zone increases in an upward direction thereof, and mobilisation nozzle means operable to supply gaseous mobilising medium to said zone at a multiplicity of sites of said wall means, whereby in operation of said apparatus to mobilise particulate material there obtains in said zone a circulatory pattern comprising downward flow at said walls means and upward flow from a lower region of said zone.

Advantageously, the mobilising apparatus further comprising acceleration nozzle means operable to supply gaseous accelerating medium to the mobilisation zone in an upward direction from a location at a lower region of the zone.

The horizontal cross-section of the mobilisation zone can be of various shapes, including square, rectangular, circular, elliptical and polygonal. The shape may be constant or may vary from one height location of the mobilisation zone to another. The wall means may in vertical cross-section be straight; alternatively the wall means may be curved, in concave or convex fashion, over a part or the whole of the upward extent thereof. If the horizontal cross-section of the mobilisation zone is of square shape, or of other shape having oppositely situated and parallel wall members of the wall means, such wall members are preferably symmetrically configured with reference to a central vertical plane or axis. If the horizontal cross-section of the mobilisation zone is of square shape and the apparatus is to be used for the treatment of cut lamina tobaccos the angle of upward divergence from the vertical of such wall members is suitably in the region of 30 degrees.

At the bottom of the mobilisation zone the horizontal cross-section thereof should preferably be small in comparison with the horizontal cross-section at the top of the zone.

Suitably, the mobilisation nozzle means takes the form of an array of perforations in the wall means. The perforated wall means may bound plenum chamber means with which the perforations directly communicate.

Apparatus according to the present invention can provide a cell in an array of juxtaposed similar cells, which array constitutes a larger, composite apparatus.

The treatments of particulate materials which may be practised using the method or apparatus according to the present invention include drying, moistening, heating, cooling, blending, mixing, expanding or applying a flavourant or other additive. The treatments may also include chemical treatments.

Air is a practicable mobilising medium and a practicable accelerating medium. Steam or other vapour or gas may be injected into the mobilised bed of particulate material, either directly or with the mobilising medium and/or, when utilised, accelerating medium. Steam or other vapour or gas may be employed as mobilising and/or accelerating medium. A liquid may be sprayed onto or injected into the mobilised bed of particulate material.

The method or apparatus according to the present invention may be used for the purpose of uniformly impregnating particulate vegetable material, cut lamina tobacco for example, with an expansion agent, an organic expansion agent for example. For this purpose the expansion agent, in the vapour phase thereof, may constitute the whole or a proportion of the flow of the mobilising medium and/or, when present, the accelerating medium. Alternatively, the mobilised bed of vegetable material may be contacted with liquid phase expansion agent.

When the method provided by the present invention is carried out utilising an accelerating flow as well as a mobilising flow, the mobilising flow serves to mobilise the fibrous or other particulate material and the accelerating flow serves to enhance the circulation, and thereby the mixing, of the mobilised body of particulate material. It may be found that the total gaseous medium requirement can be reduced when an accelerating flow of gaseous medium is utilised. It has also been found that when the only gaseous flow employed is an upward flow, fibrous particulate materials remain or become entangled and so are not mobilised in the sense above defined. For any one particulate material or mobilising apparatus constructed in accordance with the present invention there will be a finite range of mobilising and accelerating flow rates within which controlled operation is possible. These ranges may be readily ascertained by simple experiment. Preferably, the mobilising flow is established before initiation of the accelerating flow.

In order that the invention may be clearly understood and readily carried into effect, reference will now be made, by way of example, to the accompanying drawings, in which.

Figure 2:
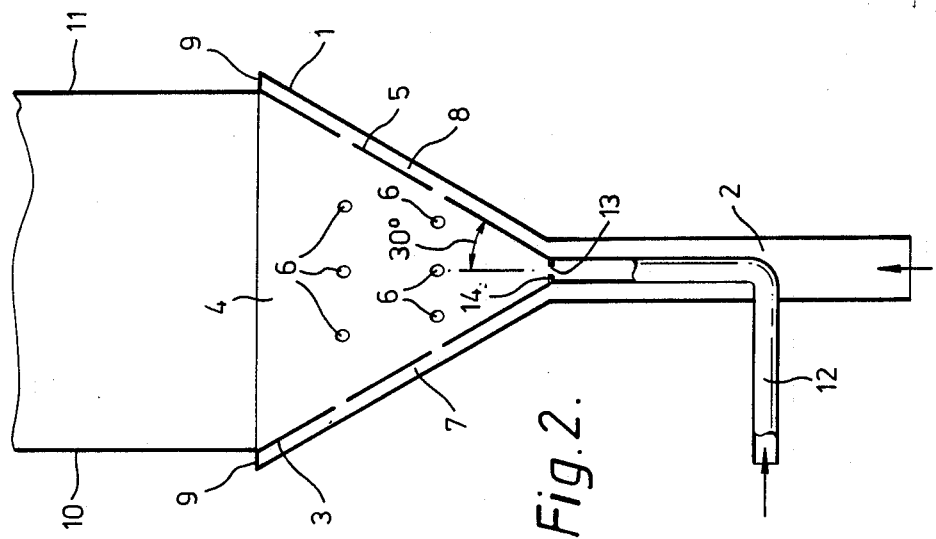
FIG. 2 shows diagrammatically a sectional view of the apparatus of FIG. 1, the section being taken at a central vertical plane indicated by lines II—II.
Figure 1:
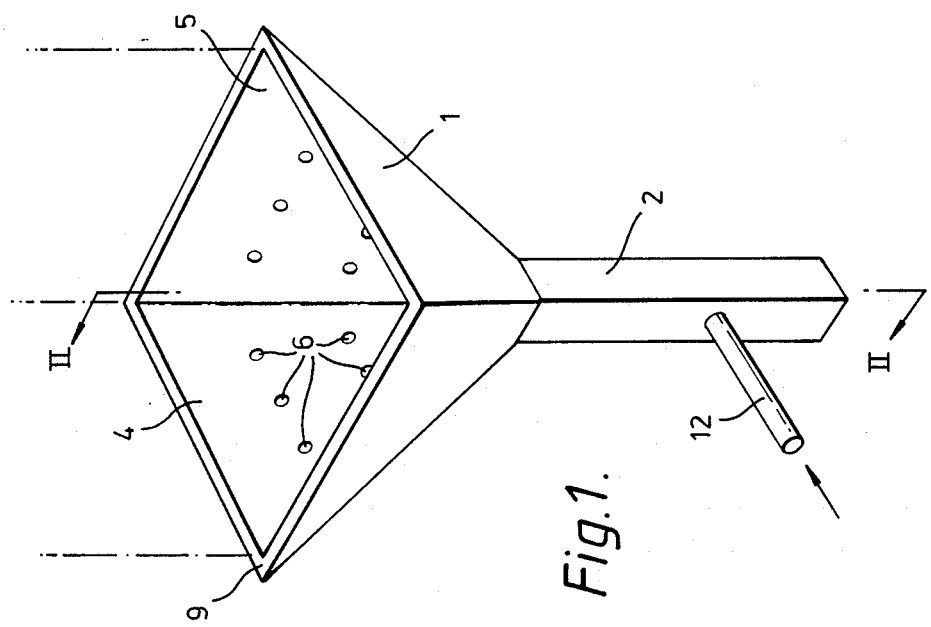
FIG. 1 shows diagrammatically a perspective view of a mobilising apparatus.

The mobilising apparatus shown in FIGS. 1 and 2 comprises a square section casing 1, the four walls of which are upwardly divergent at an angle of 30 degrees to the vertical. Extending vertically downwardly from the lower end of the casing 1 is trunking 2. Disposed inwardly of each wall of the casing is a diffuser plate, the diffuser plates indicated in FIG. 2 being designated by reference numerals 3, 4 and 5. Each of the plates 3-5, and an exactly similar diffuser plate located opposite plate 4 and associated with the front wall of the casing 1, is spaced from the associated casing side wall and extends parallel thereto. An identical array, comprising upper and lower rows of perforations, each of 4.5 mm diameter, is provided in each of the diffuser plates, the perforations of the plate 4 being designated 6. The diffuser plates provide wall means of the apparatus and the perforations therein constitute first nozzle means.

At the upper ends thereof, the spaces between the diffuser plates and the associated casing side walls, the two of which spaces seen in FIG. 2 being designated 7 and 8, are closed by a plate 9. These spaces provide outer plenum chamber means. Extending vertically upwardly from the upper end of each of the diffuser plates is a containment wall, the containment walls associated with the diffuser plates 3 and 5 being designated by reference numerals 10 and 11 (FIG. 2) and the lines of juncture of the containment walls being indicated by broken lines in FIG. 1.

A pipe 12 extends through the wall of trunking 2 and upwardly therewithin. The upper end of the pipe 12 is joined to the lower ends of the diffuser plates. Fitted across the pipe 12 at its upper end is an orifice plate 13 through which extends an orifice 14 or 7 mm diameter providing second nozzle means.

In use of the mobilising cell to dry moist cut lamina tobacco, a quantity of the tobacco (not shown) is disposed within the space jointly defined by the four diffuser plates, which space provides a mobilisation zone. Warm mobilising air is supplied under low pressure to the trunking 2 and passes therefrom to the spaces 7 and 8 and the corresponding spaces associated with the front and rear walls of casing 1. From these spaces this warm air passes through the perforations in the diffuser plates and thus into contact with the cut tobacco. Warm accelerating air is supplied under low pressure to the pipe 10, from which it issues in a vertically upward direction into the tobacco. As a result of the geometry of the mobilising zone and the provision of mobilising air and accelerating air there is assured a controlled mobilisation of the cut tobacco resulting in a disentanglement of the elongate fibres, this in turn permitting the attainment of a close approach to a perfect mixing condition. There is thus achieved an improved drying of the moist cut tobacco. It has been found that the process can be operated with very little degradation of the tobacco. It may be noted that vibration of the apparatus is not required.

Figure 3:
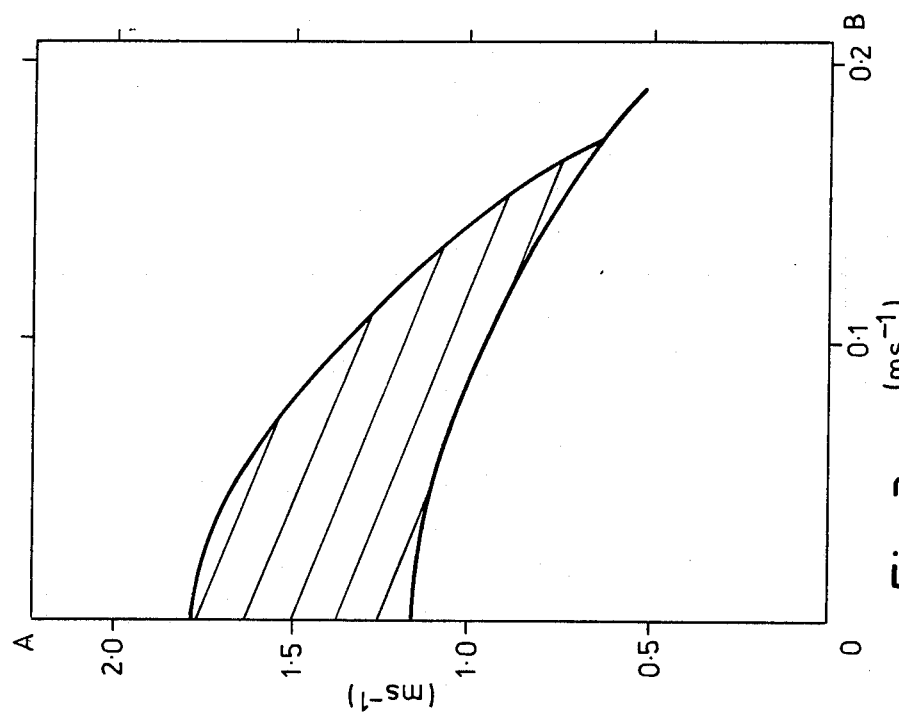
FIG. 3 is a graph indicating the ranges of mobilising gas velocity (axis A) and accelerating gas velocity (axis B) for which controlled operation is possible when the apparatus of FIGS. 1 and 2 is used for drying a cut lamina tobacco.

The hatched area shown on the graph depicted in FIG. 3 represents the zone of controlled operation of the above described apparatus in terms of the superficial velocity of the mobilising air (vertical axis A) and the superficial velocity of the accelerating air (horizontal axis B) when the apparatus is used for drying a current commercial cut lamina tobacco of flue-cured type. The velocity units are meters per second. It may be noted that within the zone of controlled operation the velocity of the accelerating or upwardly flowing air is less than the velocity of the mobilising or disentangling air.

Figure 4:
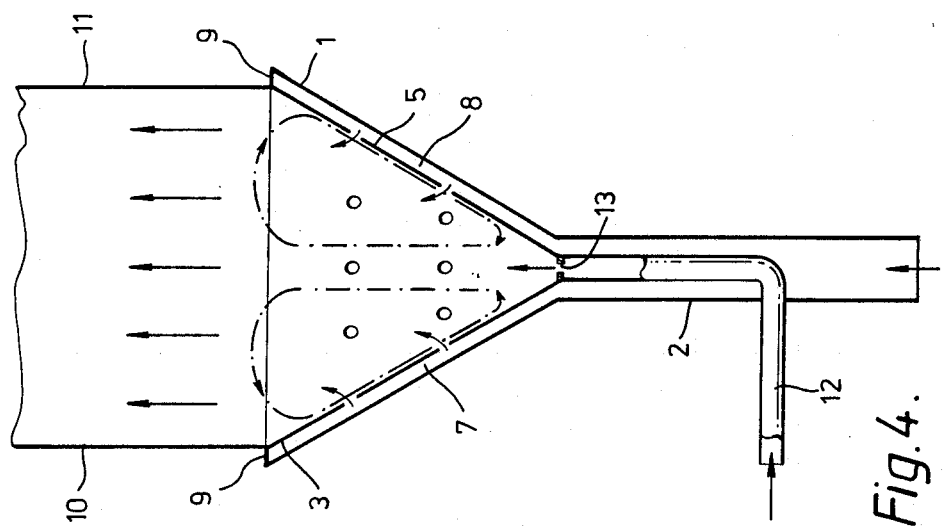
FIG. 4 shows a view similar to that of FIG. 3 but also includes an indication of a circulatory pattern in a mobilisation zone of the apparatus.

In FIG. 4 there is indicated the circulatory pattern of air and entrained tobacco particles which obtains in the mobilised bed. It may be observed that there are downward flows at the sloping walls defining the mobilisation zone and a vertically upward flow centrally of the zone. The circulatory pattern further comprises outward flows from the central zone. The mobilised bed is located substantially wholly within the space defined by the divergent walls, i.e. diffuser plates.

The basic circulatory pattern just referred to is established by the mobilising flow, but is enhanced by the presence of the accelerating flow.

The circulatory flow is, of course, superimposed upon a general upward flow of air within the apparatus.

In the above described apparatus there is provided a single acceleration nozzle means, i.e. orifice 14, for the conveyance of accelarating medium to the bed of tobacco. In a modified form of the apparatus a plurality of orifices are provided by way of which a plurality of streams of accelerating medium are directed upwardly into the tobacco bed. The orifice plate 13 could be replaced by an element of sintered or woven construction.

Although as above described there are two rows of perforations 6, and preferably there are at least two rows, more than two rows could be employed.

Having regard to the downward flows at the diffuser plates, it might be thought appropriate to replace the perforations 6 by nozzle means which direct the mobilising air in a downward direction parallel with the diffuser plates. However, such an arrangement has been found to be less than advantageous.

The mobilising apparatus of FIGS. 1 and 2 could be used to provide a cell in an array of juxtaposed similar cells constituting a larger, composite mobilising apparatus.

Apparatus according to the present invention could be used to provide a particle separator in smoking article making machines as disclosed in United Kingdom Patent Specification No. 2 129 275A.

What is claimed is:

1. A method of disentangling entangled fibrous particulate material, which comprises; introducing the entangled material into apparatus wherein the particulate material is disentangled and maintained in a mobilized state in a mobilization zone bounded by wall means upwardly divergent from the vertical, whereby the horizontal cross-sectional area of said zone increases in an upward direction thereof, gaseous disentangling and mobilizing medium being supplied at a multiplicity of sites of said wall means to said zone whereby there obtains in said zone a circulatory pattern comprising downward flow at said wall and upward flow from a lower region of said zone.

2. A method according to claim 1, wherein said particulate material is cut tobacco.

3. A method according to claim 1, wherein said mobilising medium comprises air.

4. A method according to claim 1, wherein said mobilising medium comprises steam.

5. A method according to claim 1, wherein gaseous accelerating medium is supplied to said zone in an upward direction from a location at a lower region of said zone.

6. A method according to claim 6, wherein said accelerating medium comprises air.

7. A method according to claim 6, wherein said accelerating medium comprises steam.

8. A method according to claim 1, wherein the mobilised particulate material is contacted with an expansion agent.

9. Apparatus for disentangling entangled fibrous particulate materials, which comprises; wall means bounding a mobilization zone, said wall means being wholly upwardly divergent from the vertical whereby the horizontal cross-sectional area of said zone increases in an upward direction thereof, and mobilization nozzle means operable to supply gaseous disentangling and mobilizing medium to said zone at a multiplicity of sites of said wall means, whereby in operation of said apparatus to mobilize and disentangle fibrous particulate material there obtains in said zone a circulatory pattern comprising downward flow at said wall means and upward flow from a lower region of said zone.

10. Apparatus according to claim 9, wherein acceleration nozzle means is operable to supply gaseous accelerating medium to said zone in an upward direction from a location at a lower region of said zone.

11. Apparatus according to claim 9, wherein at the location of the upwardly divergent portion of said wall means, said mobilisation zone is, in plan view, of substantially square configuration.

12. Apparatus according to claim 9, wherein at the location of the upwardly divergent portion of said wall means, said mobilisation zone is, in plan view, of substantially circular configuration.

13. Apparatus according to claims 9, wherein the angle of divergence from the vertical of the upwardly divergent portion of said wall means is in the region of thirty degrees.

14. Apparatus according to claim 9, wherein said mobilisation nozzle means is provided by an array of perforation in said wall means.

15. Apparatus according to claim 14, wherein in the zone of said array of perforations said wall means bounds plenum chamber means.

16. Apparatus according to claim 9, wherein containment wall means extend upwardly of said mobilisation zone.

* * * * *